June 30, 1970  V. N. ALBERTSON  3,517,652
TWO-CYCLE ENGINE

Filed May 10, 1968  4 Sheets-Sheet 1

INVENTOR
VICTOR N. ALBERTSON
BY
ATTORNEY

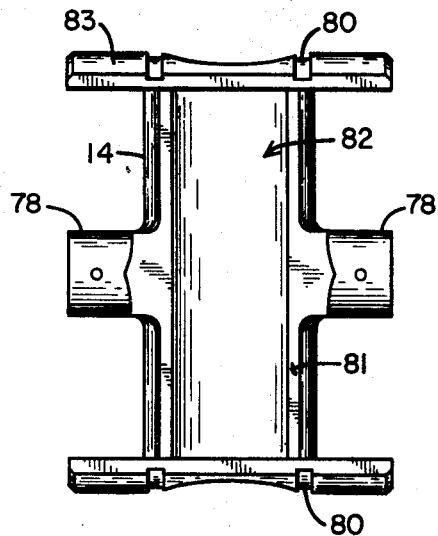
Fig. 4a
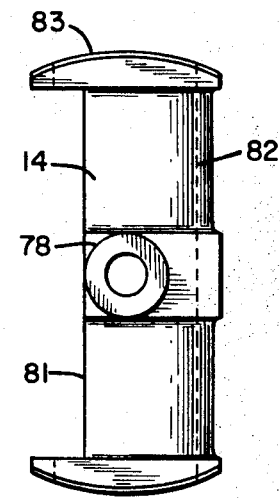
Fig. 4c
Fig. 5c
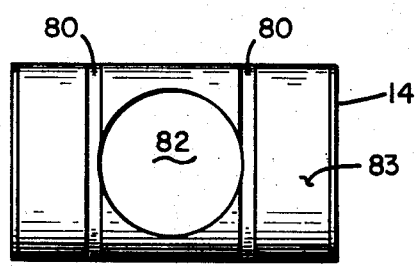
Fig. 4b
Fig. 5b
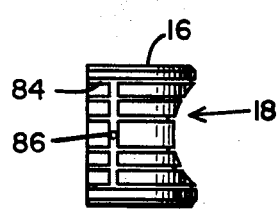
Fig. 5a

United States Patent Office 3,517,652
Patented June 30, 1970

3,517,652
TWO-CYCLE ENGINE
Victor N. Albertson, Minneapolis, Minn., assignor to The Johnson Engine Works Company, Minneapolis, Minn., a corporation of Minnesota
Filed May 10, 1968, Ser. No. 728,207
Int. Cl. F02b 33/12, 75/24; F16b 21/18
U.S. Cl. 123—65                                           5 Claims

ABSTRACT OF THE DISCLOSURE

A floating piston type two-cycle engine that requires less critical tolerances in connecting the crankshaft to the piston rods and which has an improved cylindrical crankcase, a translator for cooperating with the crankcase and being slidably mounted therein with the crankcase acting as a bearing surface, and a crankshaft assembly for changing the rectilinear motion of the piston assembly into rotary motion of the crankshaft.

Background of the invention

There is a large demand today for two-cycle engines in a variety of applications. These applications include, but are not limited to, snowmobiles, garden tractors, lawn mowers, snow blowers, etc. These engines can also be used in pilotless drone type aircraft.

There are a great many disadvantages associated with this type engine. First, they are expensive because of the critical tolerances required in aligning crankshaft, bearing and piston assemblies. Secondly, side thrusts on the pistons cause extensive wearing of the pistons and require frequent overhaul. Third, large intake and exhaust ports are required for two reasons. One of these reasons is that the entire crankcase is used as a compression chamber for obtaining scavenging pressure and thus, because of the volume, very low scavenging pressures are obtained. The other reason for large intake and exhaust ports is that in the conventional two cycle engine, lubrication is obtained by mixing the oil and fuel and thus heavy carbon deposits are formed in the combustion chamber which would completely block small intake and exhaust ports. Further, poor lubrication results from this operation. Such large intake and exhaust ports as are used on the conventional two-cycle engine are undesirable because they prevent accurate control of the use of the input fuel and the combustion products. In other words, large ports cannot be opened or closed with extreme accuracy and there is a large waste of fuel in the combustion products. Finally, the power-to-weight ratio of the conventional two cycle engines is small.

Prior art engines have attempted to overcome the disadvantages of the conventional two cycle engine by utilizing horizontally opposed twin cylinders with the piston rods having one end rigidly fixed to the pistons and supported at the other end by the well known Scotch-yoke arrangement that transmitted power to the crankshaft through a crankpin. This is accomplished by a slipper which slides in the yoke and which, in turn, is mounted on the crankpin. The crankpin is free to rotate in the slipper which slides up and down the yoke as the crankshaft revolves.

A number of advantages can be achieved with this type of engine. First, side thrusts on the pistons are eliminated and, consequently, there is a considerable reduction in friction and wear between the piston and the cylinder wall. Secondly, by isolating the crankcase from the cylinders, greater compression of the fuel-air mixture can occur and therefore greater scavenging pressures can occur which enable the use of smaller exhaust ports which, in turn, allow better control of the engine. Third, greater force is transmitted to the crankpin since the direction of thrust upon the crankpin is in line with the travel of the crankpin at the mid-stroke position whereas in the conventional engine the piston thrust is at an angle to the travel of the crankpin throughout the stroke. Fourth, as mentioned earlier, greater scavenging pressures are obtained. Fifth, the corrosive effects of the burned gases are isolated from the crankcase. Finally, there is a tremendous reduction of inertia stresses when compared to the conventional engine in that in the conventional engine the connecting rod has to bring the piston to a dead stop at top dead center whereas in the free floating piston type two-cycle engine the movement of the piston rod assembly is cushioned at each end of the stroke by the compression of two separate fuel-air mixtures as will be explained.

Thus, the free floating piston type two-cycle engine has many advantages over the conventional engines. However, some problems still exist. First, if the yoke or translator is unsupported in the crankcase, the glands or oil seals must be made sufficiently strong and bulky to absorb any forces or stresses applied to the translator. Prior art patents have attempted to solve this problem by building up surfaces upon which the translator can ride or by providing guides in which the translator rides. This, of course, requires added weight and more costly construction since the added masses must be attached to the crankcase and strict tolerances in the matching of the translator with the surfaces is required. Secondly, the slipper which rides in the translator and which receives the crankpin and causes the crankshaft to rotate, is rigidly mounted in the translator and is free to move only along the channel in which it is mounted. This requires strict tolerances to be followed in the manufacture of the crankshaft, crankpin and the crankshaft mounting flange and support which is an integral part of the crankcase. If any misalignment does exist between the slipper and the crankpin, forces are exerted at a point on the crankpin which tends to cause failures of the pin.

Summary of the invention

The present invention overcomes the disadvantages of the prior art by eliminating side thrusts on the piston rods entirely by providing an improved translator and crankcase. The translator is of a novel design and includes a new and improved slipper for mating the translator to the crankpin.

In applicant's improved engine, the translator rides on the walls of the crankcase which is cylindrical in shape. Thus, the crankcase is simple to manufacture in that it requires only a rough casting, the bore of which is machined to the proper inside diameter.

Rotary motion of the crankshaft causes forces which are absorbed by the translator acting as a bearing rather than the piston rods and thus eliminates side thrusts on the piston rods themselves. Thus, the piston rods themselves may be of smaller diameter since they absorb no side thrust forces. Smaller diameter piston rods also enable better sealing to exist between the crankcase and cylinder chamber. The translator is a modified Scotch-yoke design in which slides a slipper, which in turn is mounted on the crankpin. The slipper is an improved type that does not just slide up and down in the translator, but is also movable about the axis along which it moves. This feature enables less critical tolerances to be used in the machining and mounting of the crankshaft and crankpin in the crankcase.

Further, circumferential grooves about the periphery of the slipper provide for adequate lubrication thereof.

Thus, it is an object of the present invention to provide an improved translator or yoke assembly for a free-floating piston-type two-cycle engine.

It is a further object of this invention to provide a free-floating, piston-type two-cycle engine having a cylindrical type crankcase which serves as a bearing surface upon which the translator or yoke can ride.

It is also another object of the present invention to provide a new and improved slipper for mating the translator to the crankpin.

It is yet another object of the present invention to provide a new and improved slipper which allows movement about the axis along which it moves.

Brief description of the drawings

These and other more detailed and specific objects will be disclosed in the course of the following specification, reference being had to the accompanying drawings, in which:

FIG. 3 is a cross-sectional view taken on line 3—3 of FIG. 2a;

FIGS. 4a, b and c are front top and side elevations of the new and unique translator;

FIGS. 5a, b and c illustrate the novel slipper which rides in the translator and which accepts the crankpin and transfers the forces from the crankpin to the translator;

Description of the preferred embodiment

Figure 1:
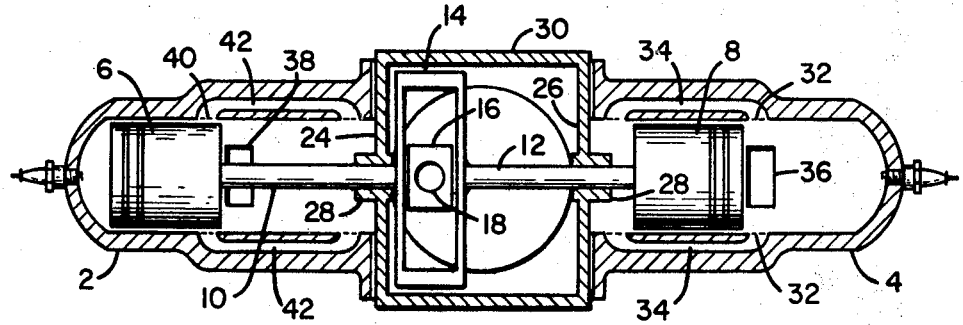
FIG. 1 is a diagrammatic sketch of the general arrangement of a prior art free-floating piston-type two-cycle engine.

FIG. 1 illustrates the general arrangement of the prior art free-floating piston-type two-cycle engine. Basically, the engine is a horizontally opposed twin-cylinder unit with cylinders 2 and 4 receiving pistons 6 and 8 respectively. Piston rods 10 and 12 are connected at one end to pistons 6 and 8 respectively and are attached to their other ends to a yoke or translator 14, in which slides a slipper 16, which in turn has a bore 18 for receiving a crankpin 20 shown in FIGS. 6a and 6b. The crankpin 20 is free to rotate in the slipper 16. The slipper slides up and down in the yoke or translator 14 and causes the crankshaft 22 shown in FIG. 6a and FIG. 6b, to revolve.

The inner ends of cylinders 2 and 4 are closed by covers 24 and 26 respectively each of which is provided with centrally located glands or oil seals 28 through which the piston rods 10 and 12 reciprocate. Since the crankcase 30 is isolated from the cylinders 2 and 4 by covers 24 and 26 respectively, the crankcase 30 can be utilized for pressure lubrication and there is no mixing of oil and fuel. Thus, more complete and efficient burning of the fuel is obtained. Further, the interior of the crankcase 30 is completely isolated from the corrosive effect of the condensation from the burnt gases which is normally attributed to "blow-by."

As piston 8 approaches bottom dead center, the location in which it is shown, it compresses an intake fuel-air mixture which is drawn in through a port not shown. As the piston 8 reaches bottom dead center, it uncovers ports 32 which allows the compressed fuel-air mixture to pass through passages 34 into the cylinder head where the compressed mixture scavenges the burnt fuel and forces it out exhaust port 36. In the meantime, the opposite cylinder has fired and both pistons 6 and 8 and associated rods 10 and 12 begin to move toward the top of cylinder 4. Piston 8 covers exhaust port 36 and port 32 and begins to compress the fuel-air mixture trapped in cylinder 4.

Piston 6, as it had previously moved toward its own top dead center, had drawn a fuel-air mixture in through inlet port 38. Now, as it is moving with piston 8 in a direction toward the top of cylinder 4, it closes off inlet port 38 and compresses the fuel-air mixture trapped between the bottom of piston 6 and cover 24. When it reaches bottom dead center, it will have uncovered its ports 40 which allows the compressed fuel-air mixture to pass through passages 42 into the cylinder head where the compressed mixture scavenges the burnt fuel through the uncovered exhaust port (not shown).

Thus, the cylinders fire alternately and both pistons move in the same direction, either to the right or the left. The engine is not in complete balance at this time; however, effects of vibration are reduced considerably by the fact that the movement of the piston rod assembly is cushioned at each end of its travel, not only by the compression of the fuel-air mixture prior to firing in one cylinder, but also by the pre-compression of the fuel-air intake mixture in the other cylinder.

However, it will be noted that translator 14 is not supported within the crankcase and must, therefore, transfer any transverse forces to glands or oil seals 28. Further, it will be noted that slipper 16 is mated to the yoke or translator 14 such that it merely slides up and down the yoke in a fixed position.

Figure 2B:
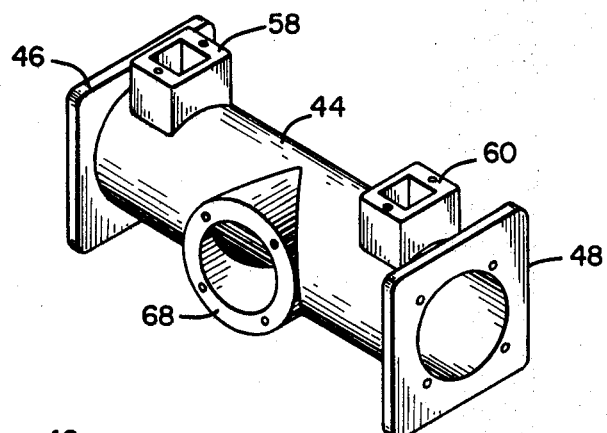
FIG. 2b is a perspective view of the unique crankcase.
Figure 2A:
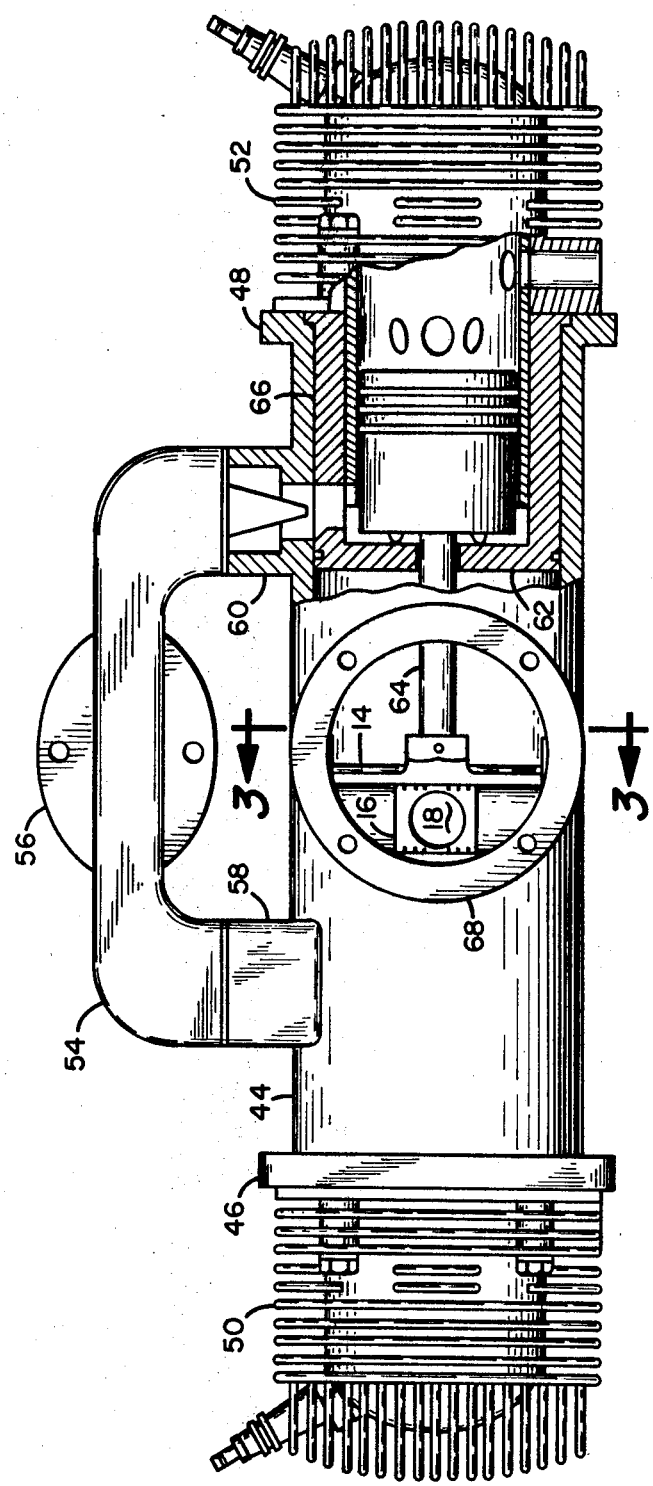
FIG. 2a is a diagrammatic sketch of the general arrangement of the present inventive free-floating piston-type two-cycle engine.

Applicant's improved engine is shown in FIG. 2a and includes crankcase 44 which has flanges 46 and 48 at the ends as shown. To these flanges are attached cylinder heads 50 and 52 respectively. Intake manifold 54 may have a carburetor (not shown) mounted on flange 56 to provide a fuel-air mixture to intake valves 58 and 60 which may be, for example, reed valves. Wall 62 separates the crankcase from the interior of the cylinder head 52. Piston rod 64 passes through an opening in the wall. Oil seals, not shown, prevent leakage from one chamber to another around the piston rod. Wall 62 may be the bottom of a cup-shaped member 66 which slidably fits into crankcase 44 and is locked into place when cylinder head 52 is fastened to flange 48. Through the opening at crankshaft mounting flange 68 may be seen translator 14 to which piston rod 64 is connected. Slidably mounted in translator 14 is slipper 16 which has bore 18 for receiving the crankpin of the crankshaft.

It should be noted that crankcase 44 is of unitary construction and, as shown in the perspective view of FIG. 2b, can be a simple, rough casting which has the cylindrical interior machined to the proper tolerances. Integrally formed crankshaft mounting flange 68 may be likewise machined. Fuel-air intake ports 58 and 60 are also an integral part of the casting and may be machined to receive the proper intake valve such as a reed valve.

Figure 3:
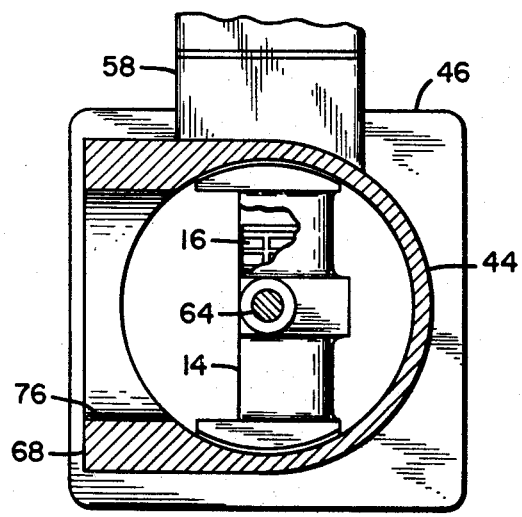

FIG. 3 is a cross-sectional view of the engine taken on line 3—3 of FIG. 2a and shows translator 14 riding on the inside surface of cylindrical crankcase 44. Slipper 16 can be seen partially in the cut-away view of translator 14. Piston rod 64 attaches to translator 14 at the location shown. As can be seen, crankshaft mounting flange 68 is integrally formed with the crankcase. The crankshaft 22, shown in FIG. 6a, fits in bore 76 which is machined to the proper diameter. Mounting flange 46 is shown to which cylinder head 50 is attached. Also shown is fuel-air intake port 58.

FIG. 4a is a front view of translator 14 showing mounts 78 to which the piston rods attach. Oil slots 80 can be seen on the top and bottom of translator 14. These slots retain oil as the translator 14 moves back and forth in the cylindrical crankcase 44. As can be seen, translator 14 is a unitary, elongated, hollow cylindrical body having an arcuate portion thereof removed at 81 to form a C-shaped body whereby the inside 82 of the hollow body is exposed. Arcuate end portions 83 are integrally formed with said body and have a curvature corresponding to said cylindrical crankcase whereby the translator 14 can be slidably mounted in said crankcase.

Slipper 16 slides in slot 82 of translator 14 and can best be seen in FIG. 4b which is a top view of the translator. Oil slots 80 can also be seen in their entirety in this view.

FIG. 4c is a side view of translator 14 and shows the curvature at the top and bottom portions 83 of the translator which matches the curvature of the crankcase 44 and which rides on the crankcase interior surface as a bearing.

As can be seen in FIGS. 4a, 4b, and 4c, translator 14 is of unitary construction and is machined to the proper dimensions.

FIGS. 5a, b and c are side, front and top views, respectively, of slipper 16 showing oil grooves 84 about the periphery of the slipper. These grooves carry oil completely around the slipper as the slipper moves in slot 82 of translator 14. Slipper 16 also has bore 18 which accepts crankpin 20 of crankshaft 22. Bore 18 has hole 86 extending through the wall of slipper 16 to enable lubrication of crankpin 20. It will be noted that slipper 16 is cylindrical in shape. This is an important feature since it allows rotation about the axis along which it moves. This feature enables better mating between the slipper and crankpin without requiring precision alignment of bore 76, slipper 16 and crankshaft 22. Thus if distortional forces are present the slipper is free to rotate with the forces to assure full bearing surface contact with the crankpin.

Figure 6A:
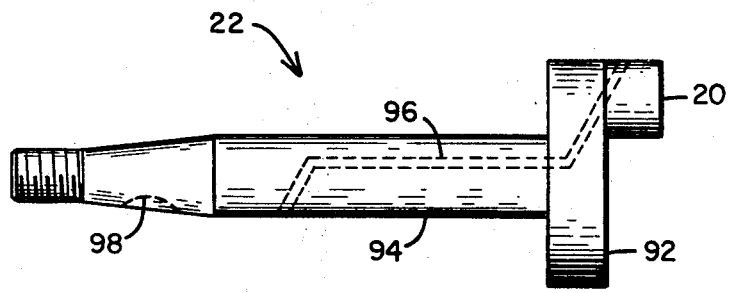
FIGS. 6a and 6b illustrate the crankshaft and crankpin which delivers power to the slipper in the translator.
Figure 6B:
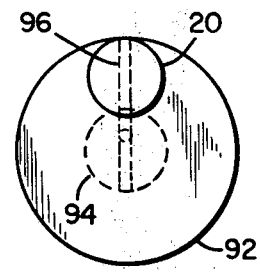

FIG. 6a is a side view of crankshaft 22 showing crankpin 20, crankshaft throw 92, center shaft 94, oil passage 96 and flywheel attaching slot 98.

Crankpin 20 fits into bore 18 of slipper 16 as shown in FIGS. 1, 2a, 5a and 5b.

Figure 7:
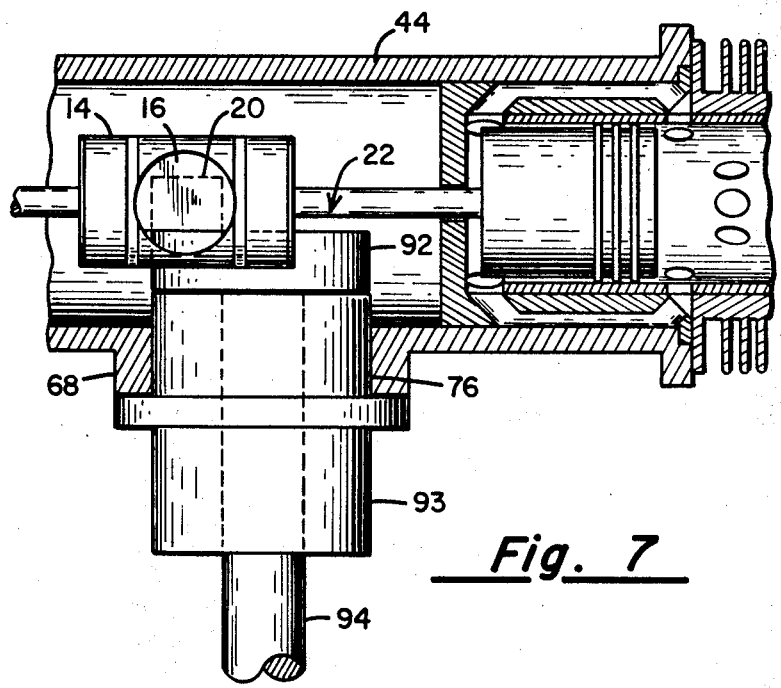
FIG. 7 is a cutaway portion of crankcase 44.

Crankshaft throw 92 rests in bore 76 of crankshaft mounting flange 68 as shown in FIG. 7.

Center shaft 94 can be attached to any drive means such as a flywheel through the use of conventional slot 98 which receives a pin that attaches the flywheel.

Oil passage 96 carries oil from a source, not shown, through the crankshaft 22 and out crankpin 20 into slipper 16.

FIG. 7 shows a top view of a cutaway portion of crankcase 44 showing crankshaft 22 rotatably mounted in a bearing 93 which is rigidly mounted in bore 76 of crankcase mounting flange 68. Crankpin 20 is mated in bore 18 of slipper 16 which is slidably positioned in translator 14.

It is understood that suitable modifications may be made in the structure as disclosed, provided such modifications come within the spirit and scope of the appended claims. Having now, therefore, fully illustrated and described my invention, what I claim to be new and desire to protect by Letters Patent is:

1. In a two-cycle engine having horizontally opposed twin cylinders, a crankcase, walls separating said cylinders from said crankcase, piston rods extending through said walls and having one end rigidly attached to the pistons in the cylinders and the other end supported by a translator in the crankcase which transmits power to the crankshaft through a crankpin, the improvement comprising:
    (a) a cylindrical shaped crankcase, and
    (b) a translator for cooperating with said crankcase, said translator having a curvature corresponding to said cylindrical shape and slidably mounted in said crankcase with said crankcase as a bearing surface.

2. A two-cycle engine as in claim 1 wherein said translator comprises:
    (a) a unitary, elongated, hollow cylindrical body having an arcuate surface portion thereof removed whereby the inside of said hollow body is exposed,
    (b) end portions integrally formed with said body, each of said end portions having said curvature corresponding to said cylindrical crankcase, and
    (c) first and second mounts on opposite sides of said body for attachment to said piston rods.

3. An engine as in claim 2 wherein said translator further includes:
    (a) a slipper slidably mounted in said hollow cylindrical translator body for connecting said translator to said crankshaft through a crankpin.

4. An engine as in claim 3 wherein said slipper comprises:
    (a) a cylindrical shaped body having a bore in one side thereof for receiving said crankpin and having a plurality of grooves about the periphery thererof for carrying oil during the sliding movement of said slipper.

5. A crankcase for a two-cycle engine comprising:
    (a) a hollow cylindrical body for slidably receiving a translator which transmits power to a crankshaft,
    (b) cylinder mounting flanges at each end of said body along its longitudinal axis for receiving piston cylinders, and
    (c) a crankshaft mounting flange integrally formed with and at right angles to said body for receiving a crankshaft which mates with said translator.

References Cited
UNITED STATES PATENTS

| | | | |
|---|---|---|---|
| 775,605 | 11/1904 | Langlais | 74—50 XR |
| 959,748 | 5/1910 | Holt. | |
| 1,045,505 | 11/1919 | Brauer. | |
| 1,295,947 | 3/1919 | Wolf | 74—50 XR |
| 2,495,445 | 1/1950 | Crenshaw. | |
| 2,628,602 | 2/1953 | Butterfield | 74—50 XR |

FOREIGN PATENTS

| | | |
|---|---|---|
| 17,026 | 1907 | Great Britain. |
| 218,308 | 6/1924 | Great Britain. |
| 800,514 | 11/1950 | Germany. |

WENDELL E. BURNS, Primary Examiner

U.S. Cl. X.R.

74—49; 123—56, 74